US007228054B2

(12) United States Patent
Cowgill

(10) Patent No.: US 7,228,054 B2
(45) Date of Patent: Jun. 5, 2007

(54) AUTOMATED PLAYLIST GENERATION

(75) Inventor: Clayton Neil Cowgill, Vancouver, WA (US)

(73) Assignee: SigmaTel, Inc., Austin, TX (US)

( * ) Notice: Subject to any disclaimer, the term of this patent is extended or adjusted under 35 U.S.C. 154(b) by 0 days.

(21) Appl. No.: 10/208,456

(22) Filed: Jul. 29, 2002

(65) Prior Publication Data
US 2004/0017997 A1    Jan. 29, 2004

(51) Int. Cl.
H04N 5/91    (2006.01)
(52) U.S. Cl. .......................... 386/46; 386/96
(58) Field of Classification Search ........... 386/46, 386/52, 83, 95, 125, 126, 55, 69, 70, 96; 725/39, 40, 43, 45–48, 52, 56, 53; 360/72.2; 369/30.27; 707/104.1; 709/219
See application file for complete search history.

(56) References Cited

U.S. PATENT DOCUMENTS

| 5,228,014 | A | * | 7/1993 | d'Alayer de Costemore d'Arc .......................... 360/72.2 |
| 5,630,005 | A | | 5/1997 | Ort et al. |
| 5,635,989 | A | * | 6/1997 | Rothmuller ................... 725/46 |
| 5,808,224 | A | | 9/1998 | Kato |
| 5,947,746 | A | | 9/1999 | Tsai |
| 5,969,283 | A | | 10/1999 | Looney et al. |
| 5,987,525 | A | | 11/1999 | Roberts et al. |
| 6,002,394 | A | * | 12/1999 | Schein et al. .................. 725/39 |
| 6,038,199 | A | | 3/2000 | Pawlowski et al. |
| 6,128,009 | A | * | 10/2000 | Ohkura et al. ................. 725/46 |
| 6,225,546 | B1 | | 5/2001 | Kraft et al. |
| 6,248,946 | B1 | | 6/2001 | Dwek |
| 6,252,830 | B1 | | 6/2001 | Hsu |
| 6,278,048 | B1 | | 8/2001 | Lee |
| 6,289,165 | B1 | | 9/2001 | Abecassis |
| 6,324,537 | B1 | | 11/2001 | Moran |
| 6,389,467 | B1 | | 5/2002 | Eyal |
| 6,423,892 | B1 | | 7/2002 | Ramaswamy |
| 6,438,315 | B1 | * | 8/2002 | Suzuki et al. .................. 386/95 |
| 6,446,080 | B1 | * | 9/2002 | Van Ryzin et al. ...... 707/104.1 |
| 6,496,802 | B1 | | 12/2002 | van Zoest et al. |
| 6,571,390 | B1 | * | 5/2003 | Dunn et al. .................... 725/52 |
| 6,587,835 | B1 | | 7/2003 | Treyz et al. |
| 6,590,303 | B1 | | 7/2003 | Austin et al. |

(Continued)

FOREIGN PATENT DOCUMENTS

JP    4-221489    8/1992

(Continued)

OTHER PUBLICATIONS

International Search Report for PCT/US03/23322 mailed Jul. 16, 2004.

(Continued)

Primary Examiner—James J. Groody
Assistant Examiner—Christopher Onuaku
(74) Attorney, Agent, or Firm—Toler Schaffer, LLP

(57) ABSTRACT

A digital media player. The digital media player includes storage to store media content and a user interface to provide information to a user. The information includes at least one task associated with the media content. The media player also includes a control to allow the user to select at least one task and a processor to perform a task selected by the user.

29 Claims, 2 Drawing Sheets

U.S. PATENT DOCUMENTS

| | | | |
|---|---|---|---|
| 6,693,236 B1 | 2/2004 | Gould et al. | |
| 6,714,722 B1 * | 3/2004 | Tsukidate | 386/83 |
| 6,850,252 B1 | 2/2005 | Hoffberg | |
| 6,865,600 B1 * | 3/2005 | Brydon et al. | 709/219 |
| 2002/0045960 A1 | 4/2002 | Phillips et al. | |
| 2002/0055934 A1 | 5/2002 | Lipscomb et al. | |
| 2002/0151327 A1 | 10/2002 | Levitt | |
| 2002/0152876 A1 | 10/2002 | Hughes et al. | |
| 2002/0171567 A1 | 11/2002 | Altare et al. | |
| 2002/0194260 A1 | 12/2002 | Headley et al. | |
| 2003/0086699 A1 | 5/2003 | Benyamin et al. | |
| 2003/0180032 A1 | 9/2003 | Barde et al. | |

FOREIGN PATENT DOCUMENTS

| | | |
|---|---|---|
| JP | 6-103737 | 4/1994 |
| JP | 10-247356 | 9/1998 |
| JP | 11-259271 | 9/1999 |
| JP | 2001-337960 | 12/2001 |
| JP | 2002-055993 | 2/2002 |
| JP | 2002-150664 | 5/2002 |
| WO | WO 97/05616 | 2/1997 |

OTHER PUBLICATIONS

International Preliminary Examination Report for PCT/US03/23322 dated Apr. 27, 2005.
JP 11-514482: Japanese Language Translation of International Application No. PCT/US1996/011205, WO 97/05616, filed on Jul. 2, 1996.
English Language Translation of JP 4-221489 (Abstract Only).
English Language Translation of JP 6-103737.
English Language Translation of JP 10-247356.
English Language Translation of JP 11-259271.
English Language Translation of JP 2002-055993.
English Language Translation of JP 2001-337960.
English Language Translation of JP 2002-150664.

* cited by examiner

AUTOMATED PLAYLIST GENERATION

BACKGROUND

1. Field

This disclosure relates to digital media devices, more particularly to digital media devices with stored content.

2. Background

Digital media devices include many different types of audio and visual devices that can access and 'play' digital media. Digital audio players, such as those using MP3 (Motion Picture Experts Group, Audio Layer 3) or Windows Media Audio™, formats access digital content and produce sound. Portable digital video disc (DVD) players access audio and video data from a DVD or a stored file and produce video with sound. Generally, these devices have internal storage in which the content is stored, removable media such as discs, or a mixture of both.

These devices have large quantities of storage, even in the portable configurations. They allow a user to have access to many difference types of content. For example, a digital music player may have hundreds of different tracks, covering different types of music, from opera to pop. Similarly, there may be several different artists, albums, labels, or other categories of music.

For the user, accessing a particular piece of information has largely been a labor-intensive operation with minimal assistance. Typical existing solutions cause the user to single-step through tracks or possibly pick from a list. Even in PC-based applications that let users pre-select music to be loaded on the device the selection process can be time consuming. An 'advanced' solution might allow looking at a list based on a category.

The end result is that the user spends far more time interfacing with the player than is desired. The idea of these types of devices, especially the portable devices, is for the user to enjoy the content, not spend time selecting it. The primary purpose of the device is to play music to the user. When confronted with a significant amount of content to choose from, the user often simply wants to hear music, not fumble about trying to pick and choose what to hear.

The continued popularity of radio and the tendency for people with hundreds of CD's to only listen to what is in a 5-disk changer are good examples of where convenience wins over variety. Therefore, a more programmatic solution to managing digital content for users would be useful.

SUMMARY

An embodiment of the invention is a digital media player. The digital media player includes storage to store media content and a user interface to provide information to a user. The information includes at least one task associated with the media content. The media player also includes a control to allow the user to select at least one task and a processor to perform a task selected by the user.

Another embodiment of the invention is a method of selecting music files based upon predetermined tasks, one of which is selected by the user. The method includes receiving a user input that identifies a predefined task. The method then accesses information associated with media content files and selects those media content files that fall within the predetermined task criteria. The selected media files are then presented to the user, in one embodiment of the invention.

BRIEF DESCRIPTION OF THE DRAWINGS

The invention may be best understood by reading the disclosure with reference to the drawings, wherein.

DETAILED DESCRIPTION OF THE EMBODIMENTS

Digital media players, such as audio or video players, are often designed with portability in mind. However, even portable models have plenty of storage and processing power. Application of this power and storage can be used to improve the user's interaction with the player. The user can select predefined tasks and with very few inputs select a list of media files to be played, increasing the playtime while decreasing the selection time. This list of media files to be played may be referred to as a playlist, with no limitation on the types of media files being played, or the immediacy of it being played.

Figure 1:
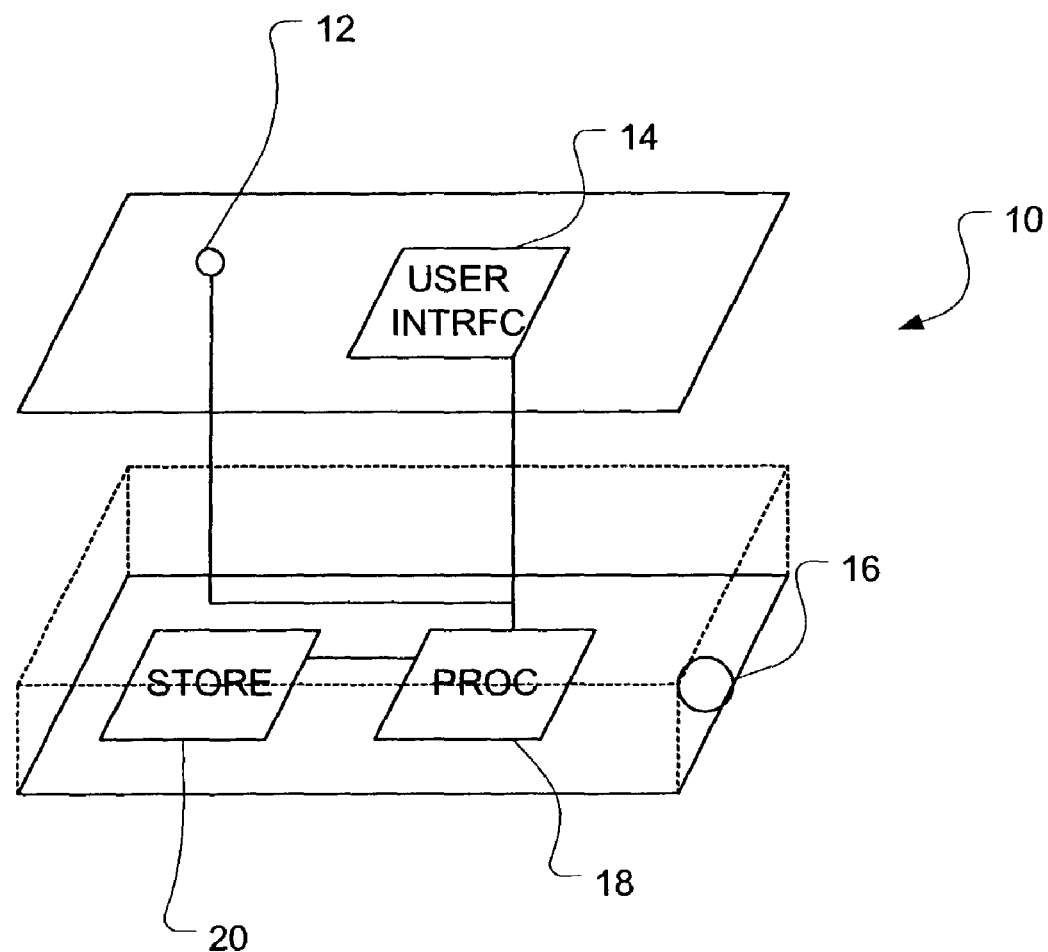
FIG. 1 shows one example of a digital media player, in accordance with and embodiment of the invention.

An example of a digital media player 10 is shown in FIG. 1. The digital media player has a front panel with a control 12 and a user interface display 14. As will be discussed later, the user interface may also include or have as an alternative, an audio user interface, such as an audio output 16. The user interface is used to transmit options to the user, such as audibly over a speaker or visually on the display. The user interface may also be used to present the media content to the user, or a combination of the two may be used. For example, the display screen may be used to present options to the user, functioning as a user interface, and the speaker may be used to present media to the user. In this example, the player would present the media content, in this case music or other audible content, to the user through the speaker. The device could use a user interface such as headphones, but it could also be connected to a home stereo to record the playlist on tape or audio CD and might not actually be 'heard' from the device. The media player also includes a storage 20 in which the media content files and information associated with the media content files is stored, and a processor 18 that receives user inputs, provides information to the user through the user interface and accesses the store according to the user inputs. In accessing the store, the processor may access the media content files or may just access the information associated with the content files to develop the list of media content files.

Figure 2:
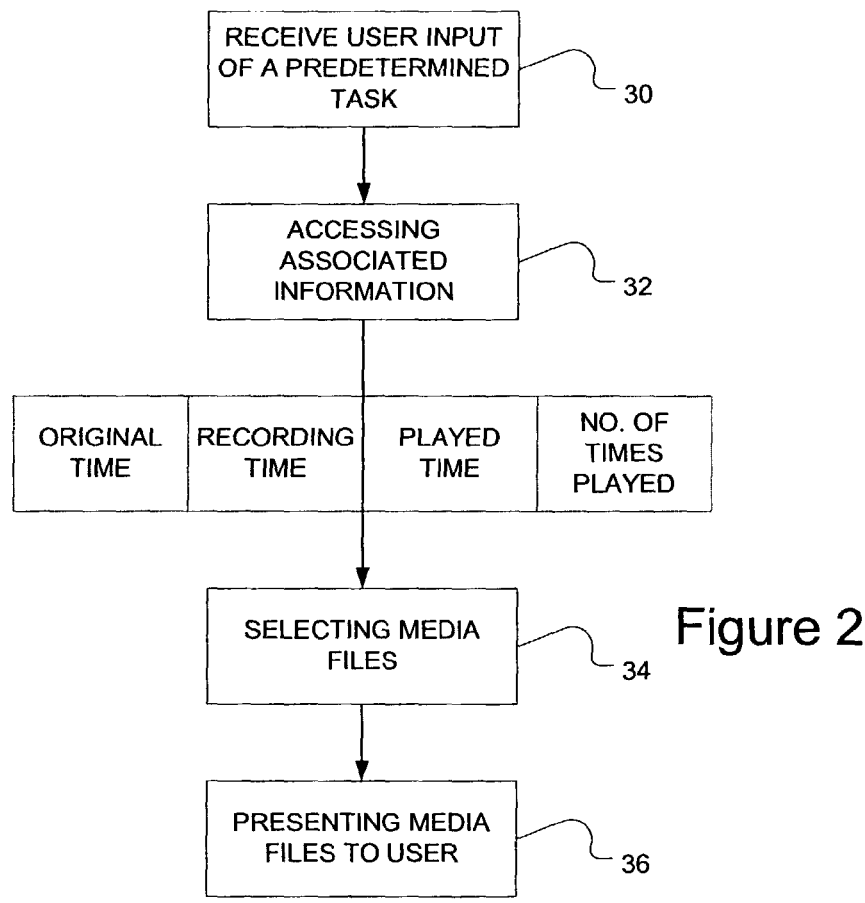
FIG. 2 shows one embodiment of a method of selecting media content files, in accordance with an embodiment of the invention.

FIG. 2 shows an embodiment of a method to select media files, in accordance with the invention. The user selects one of a set of predetermined tasks at 30. The player then accesses information associated with the media content files at 32. The information accessed depends upon the predetermined task selected, as will be discussed in more detail below. The associated information includes, but is not limited to the original time, the recording time, played time and the number of times played. The media files are then selected based upon the predetermined search criteria set out in the predetermined task. Presentation of the media files to the user at 36 may be an optional step. The application of the invention may result in a deferred list that is permanently stored on the device, or used as a seed for another operation.

The predetermined task may have several search criteria and may be automated or require a minimal number of user inputs. The following discussion of several of the predetermined tasks and search criteria is only intended to provide examples and is in no way to limit the scope of the invention.

As shown in FIG. 2, some of the search criteria determined by the selection of a predetermined task include the original time, that is the time the media content file was originally created. In contrast, the recording time is the time that the user actually recorded or transferred the file to the device. The played time is the last time the media file was played, and the number of times played is somewhat self-explanatory. Other search criteria may include principals, where the principal may be a singer, composer, songwriter or musical group for a music file, for example, or an actor, director, producer or screenwriter for a video file. Again these are only examples and are not intended to be exclusive or exhaustive lists of options.

Using the recording time, for example, the user can select a predetermined task of 'new music' or 'new movies.' This would allow the user to hear or see movies that they have recently acquired, where the recording date would be used. The length of the 'new' period could be input by the user, or even selected off a pull down menu, such as 'week,' 'month,' 'three month' time periods. The search criteria would then cause the player to access the information associated with the content files and produce a list of content files that had been acquired in the last month, for example. The files having a recording time during a time period between the current time stamp and the current time stamp minus the selected interval would be accessed.

The played time tracks the last time and date a file was played. For ease of discussion the term 'time' as used here will include time, date or both. The user then could decide to access the files that have not been played in a certain amount of time. "Play me files I haven't experienced in the last 6 months,' would result in the processor searching the associated information for files that have a playing time before a certain date. The certain date would be the current time stamp minus 6 months, in this example.

In addition to a particular date used as the threshold, the user could select dates that fall within a range. For example, the user may want to hear all tracks, or watch all clips, the originated in a particular year, such as 1984. The user may select this task and designate the time period as an additional input. The player would then access the associated information, searching for all files with an original date within that range and create the list.

Similar to selecting files from a particular period, the user may designate one or more principals. As discussed above, the user may designate a music group, a songwriter, a director, an actor, etc., as well as combinations of principals. For example, the user could designate all clips featuring Tom Hanks and Meg Ryan.

The player will track and store the number of times a particular file has been played. If the player were to sort the files by the number of times played, the user or the player could designate a number of times above which the file would be designated as a 'favorite.' Alternatively, the player or the user could designate a predetermined number of files, such as the top 40, or other number, of most-frequently accessed files.

More sophisticated measure may be used as well. For example, a weighting may be assigned to the number of times played, where the weighting may take into account the proximity of the most recent time the file was played when compared with the current time. For example, a user may have played a music file over a hundred times more than any other file, but the last time it was played was three months ago. Obviously, this is not the current 'favorite' file of the user, but a strict number of times played analysis would lead to that conclusion. Many other possibilities for weighting and manipulating the data for the 'favorites' list exist.

In addition to these, several other search criteria could be set up in predetermined tasks. Similarly, the player could present combinations of these and other criteria. For example, 'play all the music of the 1960's that I have not listened to in the last six months,' or 'show me all the clips of Tom Hanks that do not include Meg Ryan.' All of these examples discussed above provide the user with some control, while reducing the selection time required by the user. It is also possible to reduce the selection time by the user with implementation of more automated search criteria.

For example, the user could just select a feature that allows the player to make the selections. In essence the feature would provide an algorithmic representation of a radio disc jockey or movie jockey. The player would select a mix of familiar files, which may include files related to the tastes of the user, and some mostly random files to provide an interesting mix. One possible implementation uses the 'favorites' list as a seed for a list of automatically generated selections.

Figure 3:
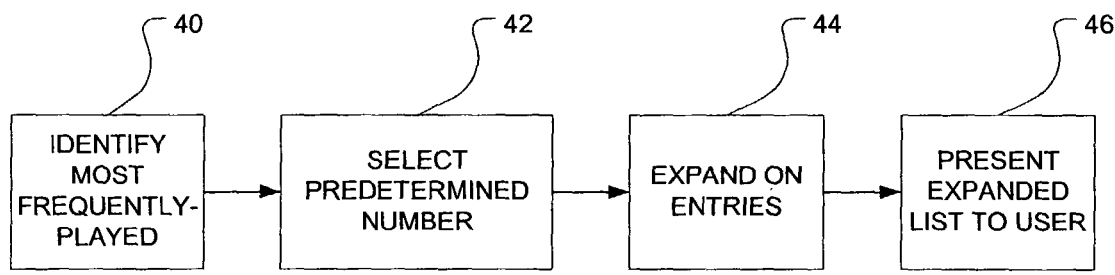
FIG. 3 shows one embodiment of a method of selecting media content files based upon an automated task, in accordance with an embodiment of the invention.

An embodiment of an automated playlist generation method is shown in FIG. 3. At 40, the original seed list of favorites is determined, in whatever manner the use or the player desires. A predetermined number of entries for the new list may be decided upon at 42, but this process is optional. The entries in the seed list are then expanded upon, by one of several techniques, examples of which are given below. The expanded list us then presented to the user, again either is a deferred list or a list for immediate play at 46.

The player may perform the expansion of the entries based upon its own preprogramming or based upon a one-time user input. Several options for expansion exist. The player could examine some top number of favorite files and add one to the playlist. The player could select one of the favorites and find another file from the same album, or program or DVD, and add it to the list. Similarly, the player could select another file based upon the genre, or the same principal. The player could add time periods, such as a file selection based upon one of the above criteria that has not been played in the last day or week or month. A completely random file selection could be added to the list. All of these approaches could be implemented separately on a predetermined number of favorite files, or they could all be implemented in one playlist, with each subsequent file be operated on by a different expansion technique.

In this manner, the user's interaction with the player for selecting files would be minimal and the user's interaction with the player for experiencing and enjoying the files would be increased. Additionally, without the need for the user to navigate huge lists of files and menus, the user interface display screen could be reduced, thereby reducing the power consumption and the size of the player or the part of the screen for the user interface. In the case of music players, the size may even be eliminated and the system switched over to a voice interface, with the user interacting with the player through voice commands.

While digital media players in general, and portable digital media players in particular, benefit from application of this invention, it may be applicable to other types of media players. The invention could be applied to removable media, such as multiple-disc CD changers. As storage capacity increases and it becomes possible to hold thousands of hours of 3D and video data, these same techniques may be applied.

Thus, although there has been described to this point a particular embodiment for a method and apparatus for automated playlist generation, it is not intended that such specific references be considered as limitations upon the scope of this invention except in-so-far as set forth in the following claims.

What is claimed is:

1. A method comprising:
   receiving, at a portable audio playback device, user input selections related to at least a first audio file search criterion and a second audio file search criterion, wherein the first audio file search criterion comprises a principal and the second audio file search criterion comprises a frequency of playback at the portable audio playback device;
   generating, at the portable audio playback device, a playlist of audio files selected from a database of audio files based on the first and second audio file search criteria, wherein an audio file of the database of audio files is selected for inclusion in the playlist of audio files if the audio file meets both of the first and the second audio file search criteria; and
   providing a representation of the playlist at the portable audio playback device.

2. The method of claim 1, wherein the principal includes at least one of a singer, a composer, a songwriter, or a musical group.

3. The method of claim 1, wherein the database of audio files is stored at a host system coupleable to a portable audio playback device.

4. The method of claim 1, wherein the database of media files is stored at a portable audio playback device.

5. The method of claim 1, further comprising:
   receiving, at the portable audio playback device, a user input selection related to a third audio file search criterion, wherein the third audio file search criterion comprises a recency of playback at the portable audio playback device; and
   wherein the playlist of audio files is selected from the database of audio files based on the third audio file search criterion, where an audio file of the database of audio files is selected for inclusion in the playlist of audio files if the audio file meets the first, second, and third audio file search criteria.

6. The method of claim 5, further comprising:
   receiving, at the portable audio playback device, a user input selection related to a fourth audio file search criterion, wherein the fourth audio file search criterion comprises a time range; and
   wherein the playlist of audio files is selected from the database of audio files based on the fourth audio file search criterion, where an audio file of the database of audio files is selected for inclusion in the playlist of audio files if the audio file meets the first, second, third, and fourth audio file search criteria.

7. The method of claim 6, wherein the time range comprises at least one of a date range associated with an addition of an audio file to the database of audio files or a date range associated with an origination of the audio content of an audio file.

8. The method of claim 6, further comprising:
   receiving, at the portable audio playback device, a user input selection related to a fifth audio file search criterion, wherein the fifth audio file search criterion comprises a second principal; and
   wherein the playlist of audio files is selected from the database of audio files based on the fifth audio file search criterion, where an audio file of the database of audio files is selected for inclusion in the playlist of audio files if the audio file meets the first, second, third, and fourth audio file search criteria, but does not meet the fifth audio file search criterion.

9. A method comprising:
   receiving, at a portable audio playback device, user input selections related to at least a first audio file search criterion and a second audio file search criterion, wherein the first audio file search criterion comprises a principal and the second audio file search criterion comprises a recency of playback at the portable audio playback device;
   generating, at the portable audio playback device, a playlist of audio files selected from a database of audio files based on the first and second audio file search criteria, wherein an audio file of the database of audio files is selected for inclusion in the playlist of audio files if the audio file meets both of the first and second audio file search criteria; and
   providing a representation of the playlist at the portable audio playback device.

10. The method of claim 9, further comprising:
    receiving, at the portable audio playback device, a user input selection related to a third audio file search criterion, wherein the third audio file search criterion comprises a time range; and
    wherein the playlist of audio files is selected from the database of audio files based on the third audio file search criterion, where an audio file of the database of audio files is selected for inclusion in the playlist of audio files if the audio file meets the first, second, and third audio file search criteria.

11. The method of claim 10, further comprising:
    receiving, at the portable audio playback device, a user input selection related to a fourth audio file search criterion, wherein the fourth audio file search criterion comprises a genre; and
    wherein the playlist of audio files is selected from the database of audio files based on the fourth audio file search criterion, where an audio file of the database of audio files is selected for inclusion in the playlist of audio files if the audio file meets the first, second, third, and fourth audio file search criteria.

12. The method of claim 9, further comprising:
    receiving, at the portable audio playback device, a user input selection related to a fifth audio file search criterion, wherein the fifth audio file search criterion comprises a frequency of playback at the portable audio playback device; and
    wherein the playlist of audio files is selected from the database of audio files based on the fifth audio file search criterion, where an audio file of the database of audio files is selected for inclusion in the playlist of audio files if the audio file meets the first, second, third, fourth and fifth audio file search criteria.

13. A method comprising:
    receiving, at a portable audio playback device, user input selections related to at least a first audio file search criterion and a second audio file search criterion, wherein the first audio file search criterion comprises a time range and the second audio file search criterion comprises a recency of playback at the portable audio playback device;

generating, at the portable audio playback device, a playlist of audio files selected from a database of audio files based on the first and second audio file search criteria, wherein an audio file of the database of audio files is selected for inclusion in the playlist of audio files if the audio file meets both of the first and second audio file search criteria; and providing a representation of the playlist at the portable audio playback device.

14. The method of claim 13, wherein the time range comprises at least one of a date range associated with an addition of an audio file to the database of audio files or a date range associated with an origination of the audio content of an audio file.

15. The method of claim 13, further comprising:
receiving, at the portable audio playback device, a user input selection related to a third audio file search criterion, wherein the third audio file search criterion comprises a frequency of playback at the portable audio playback device; and
wherein the playlist of audio files is selected from the database of audio files based on the third audio file search criterion, where an audio file of the database of audio files is selected for inclusion in the playlist of audio files if the audio file meets the first, second, and third audio file search criteria.

16. The method of claim 15, further comprising:
receiving, at the portable audio playback device, a user input selection related to a fourth audio file search criterion, wherein the fourth audio file search criterion comprises a genre; and
wherein the playlist of audio files is selected from the database of audio files based on the fourth audio file search criterion, where an audio file of the database of audio files is selected for inclusion in the playlist of audio files if the audio file meets the first, second, third, and fourth audio file search criteria.

17. The method of claim 13, further comprising:
receiving, at the portable audio playback device, a user input selection related to a fifth audio file search criterion, wherein the fifth audio file search criterion comprises a second principal; and
wherein the playlist of audio files is selected from the database of audio files based on the fifth audio file search criterion, where an audio file of the database of audio files is selected for inclusion in the playlist of audio files if the audio file meets the first, second, third, and fourth audio file search criteria, but does not meet the fifth audio file search criterion.

18. A method comprising:
receiving, at a portable audio playback device, user input selections related to at least a first audio file search criterion and a second audio file search criterion, wherein the first audio file search criterion comprises a frequency of playback at the portable audio playback device and the second audio file search criterion comprises a recency of playback at the portable audio playback device;
generating, at the portable audio playback device, a playlist of audio files selected from a database of audio files based on the first and second audio file search criteria, wherein an audio file of the database of audio files is selected for inclusion in the playlist of audio files if the audio file meets both of the first and second audio file search criteria; and providing a representation of the playlist at the portable audio playback device.

19. The method of claim 18, further comprising:
receiving, at the portable audio playback device, a user input selection related to a third audio file search criterion, wherein the third audio file search criterion comprises a time range; and
wherein the playlist of audio files is selected from the database of audio files based on the third audio file search criterion, where an audio file of the database of audio files is selected for inclusion in the playlist of audio files if the audio file meets the first, second, and third audio file search criteria.

20. The method of claim 18, further comprising:
receiving, at the portable audio playback device, a user input selection related to a third audio file search criterion, wherein the third audio file search criterion comprises a genre; and
wherein the playlist of audio files is selected from the database of audio files based on the third audio file search criterion, where an audio file of the database of audio files is selected for inclusion in the playlist of audio files if the audio file meets the first, second, and third audio file search criteria.

21. A method comprising:
receiving, at a portable audio playback device, user input selections related to at least a first audio file search criterion and a second audio file search criterion, wherein the first audio file search criterion comprises a genre and the second audio file search criterion comprises a frequency of playback at the portable audio playback device;
generating, at the portable audio playback device, a playlist of audio files selected from a database of audio files based on the first and second audio file search criteria, wherein an audio file of the database of audio files is selected for inclusion in the playlist of audio files if the audio file meets both of the first and second audio file search criteria; and
providing a representation of the playlist at the portable audio playback device.

22. A method comprising:
receiving, at a portable media playback device, user input selections related to at least a first media file search criterion and a second media file search criterion;
generating, at the portable media playback device, a playlist of media files including at least one multimedia file selected from a database of media files based on the first media file search criterion and the second media file search criterion, wherein a media file of the database of media files is selected for inclusion in the playlist of media files when the media file meets both of the first media file search criterion and the second media file search criterion; and
providing a representation of the playlist at the portable media playback device.

23. The method of claim 22, wherein the multimedia file includes both audio data and video data, and further comprising displaying the video data at a display of the portable media playback device.

24. The method of claim 23, wherein the database of media files is stored at the portable media playback device.

25. The method of claim 24, wherein the first media file search criterion includes at least one of a genre and a principal.

26. The method of claim 25, further comprising receiving, at the portable media playback device, a user input selection related to a third audio file search criterion, wherein the first media file search criterion includes a first principal, wherein the third media file search criterion includes a second principal, and wherein a media file of the database of media files is selected for inclusion in the playlist when the media file meets the first and second media file search criteria but does not meet the third media file search criterion.

27. A portable media playback device comprising:
- a memory to store multimedia files;
- a user interface configured to receive a user input selection, the user input selection to determine a playlist of multimedia files stored at the memory;
- logic to process the playlist of multimedia files, the playlist including at least one multimedia file having video data and audio data, wherein a multimedia file is selected for inclusion in the playlist when the multimedia file meets a first multimedia file search criterion;
- a display to display the video data;
- wherein the user input selection includes the first multimedia file search criterion, and wherein the playlist is generated at the portable media playback device in response to receiving the user input selection at the user interface using multimedia files stored at the memory; and wherein the user input selection further includes a second multimedia file search criterion, and wherein a multimedia file stored at the memory is selected for inclusion in the playlist of multimedia files when the multimedia file meets both of the first multimedia file search criterion and the second multimedia file search criterion.

28. The portable media playback device of claim 27, wherein the first multimedia file search criterion includes a genre and the second multimedia file search criterion includes a principal.

29. The portable media playback device of claim 27, wherein a multimedia file is selected for inclusion in the playlist further based on at least one of an album, a program and a DVD.

* * * * *